(12) United States Patent
Lamb et al.

(10) Patent No.: US 7,730,630 B1
(45) Date of Patent: Jun. 8, 2010

(54) LAYERED BEAM MEASUREMENT APPARATUS

(75) Inventors: Brian Lamb, Menlo Park, CA (US); David Titzler, Palo Alto, CA (US); Heather Fleming, Palo Alto, CA (US)

(73) Assignee: Design to Manufacturing, Inc., Mountain View, CA (US)

( * ) Notice: Subject to any disclaimer, the term of this patent is extended or adjusted under 35 U.S.C. 154(b) by 605 days.

(21) Appl. No.: 11/556,381

(22) Filed: Nov. 3, 2006

Related U.S. Application Data

(60) Provisional application No. 60/733,914, filed on Nov. 4, 2005.

(51) Int. Cl.
*G01B 3/10* (2006.01)
(52) U.S. Cl. ..................................... 33/757
(58) Field of Classification Search ............... 33/755, 33/757, 759, 764, 770, 771
See application file for complete search history.

(56) References Cited

U.S. PATENT DOCUMENTS

| | | | | |
|---|---|---|---|---|
| 1,713,891 A | * | 5/1929 | Dooley | 33/770 |
| 2,307,395 A | * | 1/1943 | Dinhofer | 33/757 |
| 2,319,724 A | * | 5/1943 | Dinhofer | 33/757 |
| 2,795,050 A | * | 6/1957 | Van Fleet | 33/757 |
| 2,835,038 A | * | 5/1958 | Perrin | 33/764 |
| 2,920,394 A | * | 1/1960 | Soderbergh | 33/764 |
| 3,242,578 A | * | 3/1966 | Moll | 33/340 |
| 4,275,503 A | * | 6/1981 | Bergkvist | 33/757 |
| 4,827,622 A | * | 5/1989 | Makar | 33/770 |
| 5,016,360 A | * | 5/1991 | Starcevich | 33/758 |
| 6,497,050 B1 | * | 12/2002 | Ricalde | 33/770 |
| 6,510,622 B2 | * | 1/2003 | Laughlin et al. | 33/770 |
| 7,062,862 B2 | * | 6/2006 | Wheaton | 33/757 |
| 2003/0154617 A1 | * | 8/2003 | Ricalde | 33/770 |

FOREIGN PATENT DOCUMENTS

| | | | | |
|---|---|---|---|---|
| GB | 2216870 A | * | 10/1989 | |
| JP | 56104201 A | * | 8/1981 | |
| JP | 2008026094 A | * | 2/2008 | |
| JP | 2009162764 A | * | 7/2009 | |
| WO | WO 2007076568 A1 | * | 7/2007 | |

\* cited by examiner

*Primary Examiner*—R. A. Smith
(74) *Attorney, Agent, or Firm*—Jeffrey Schox

(57) ABSTRACT

A new and improved tape rule that increases stiffness and standout length over standard tape rules is disclosed. The tape rule includes a primary rule and a secondary rule, the secondary rule providing increased strength. This invention can provide a variety of benefits, including increased blade flexibility while performing short extension related tasks, increased standout and reduced sag while performing tasks requiring longer extensions, reduced size and weight for tasks requiring the longest extensions and adds the ability to utilize alternate measurement methods or units and built in computational references.

17 Claims, 3 Drawing Sheets

LAYERED BEAM MEASUREMENT APPARATUS

CROSS REFERENCE TO RELATED APPLICATION

This application claims priority to Provisional Application Ser. No. 60/733,914, filed on Nov. 4, 2005

FIELD OF THE DISCLOSURE

The present disclosure relates generally to measurement tools, and in particular to tape measures.

BACKGROUND

The ideal tape rule would be perfectly flat and yet would not suffer from bending or folding when in the cantilevered position. Yet the tape rule of all tape measures loses rigidity after being extended to some length. To increase the rigidity of tape rules, tape rules of the prior art opt for either a wider tape rule or a deeper curve in the profile of the tape rule. However, a deeper profile in the tape rule results in difficulty in marking measurements on the surface being measured as the edges of the tape rule tend to curve up and away from the surface being measured. This results in the user having to tilt the tape in order to accurately mark a desired measurement.

DETAILED DESCRIPTION

Embodiments of the present invention described in the following detailed description are directed at virtual agents. Those of ordinary skill in the art will realize that the detailed description is illustrative only and is not intended to restrict the scope of the claimed inventions in any way. Other embodiments of the present invention, beyond those embodiments described in the detailed description, will readily suggest themselves to those of ordinary skill in the art having the benefit of this disclosure. Reference will now be made in detail to implementations of the present invention as illustrated in the accompanying drawings. Where appropriate, the same reference indicators will be used throughout the drawings and the following detailed description to refer to the same or similar parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
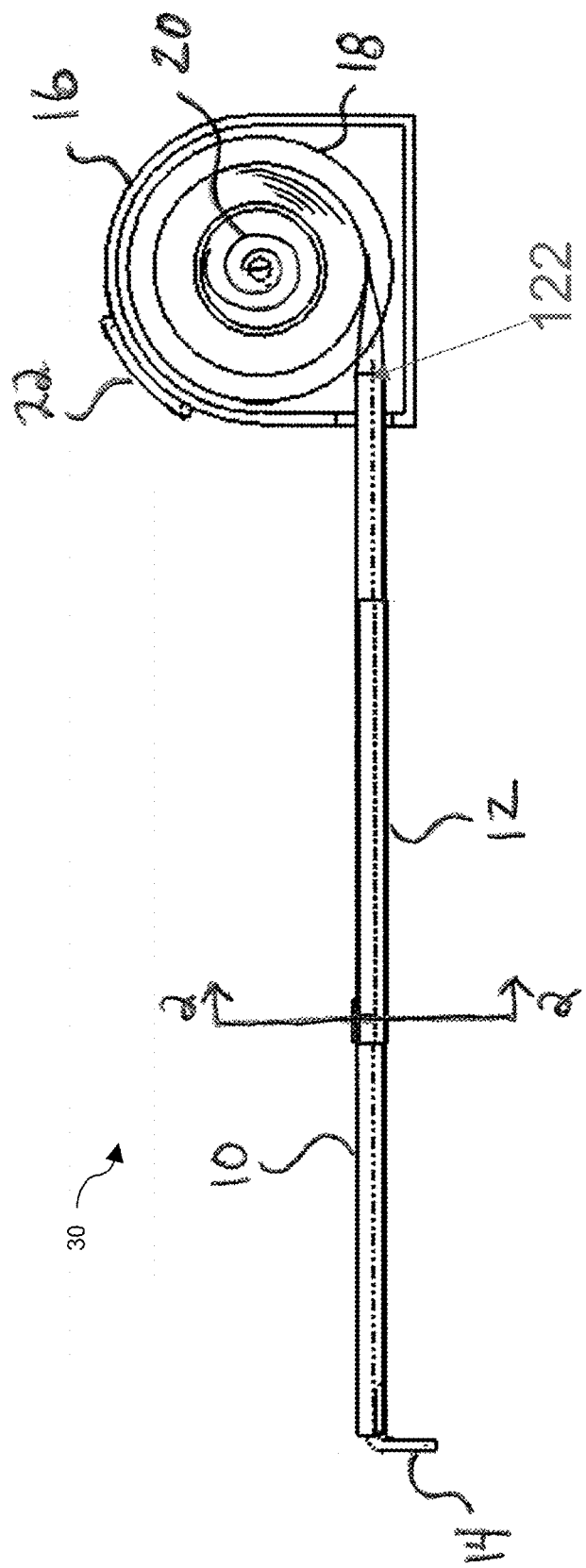
FIG. 1 is a cross-sectional diagram of a tape rule in accordance with the teachings of this disclosure.

Referring now to FIG. 1 shows a cross section of the full tape assembly 30. An end hook 14 is attached to a primary tape rule 10. Affixed to the underside of the primary tape rule 10 is a secondary tape rule 12. The secondary tape rule 12 is slidably affixed to the primary rule in at least two locations; the leading edge, closest to hook 14 and trailing ends closest to the housing 16. FIG. 1 shows the primary tape rule entering a housing 16 and connecting with a reel 18. The reel 18 is connected to a flat wound coil spring 20 that is reciprocally attached to the housing 16 so as to provide a retracting bias to the reel as is known in the art. The trailing end is preferable rigidly affixed using a weld, adhesive, rivet, hooking mechanism(s) or similar fixing method. The housing 16 may include a user-actuatable rule lock as is known in the art.

Figure 2:
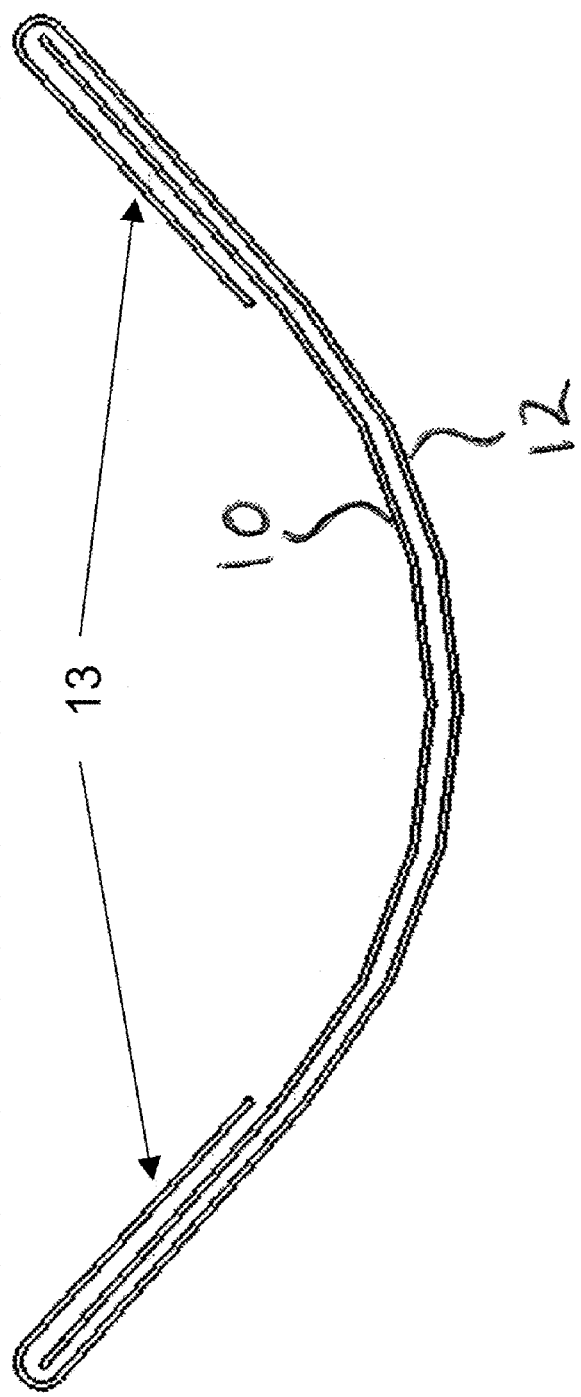
FIG. 2 is a isometric view of a tape rule assembly in accordance with the teachings of this disclosure.

Referring now to FIG. 2, a cross-sectional diagram of an assembly of the primary 10 and secondary 12 tape rules taken along section 2 of FIG. 1. In one preferred embodiment, the secondary rule 12 may include a pair of edge portions 13 that may fold over the primary rule, providing for a relative sliding motion between the two rules. The leading end may be slidably affixed in such a way as to allow lengthwise relative motion of the primary 10 and secondary 12 tape rules.

Figure 3:
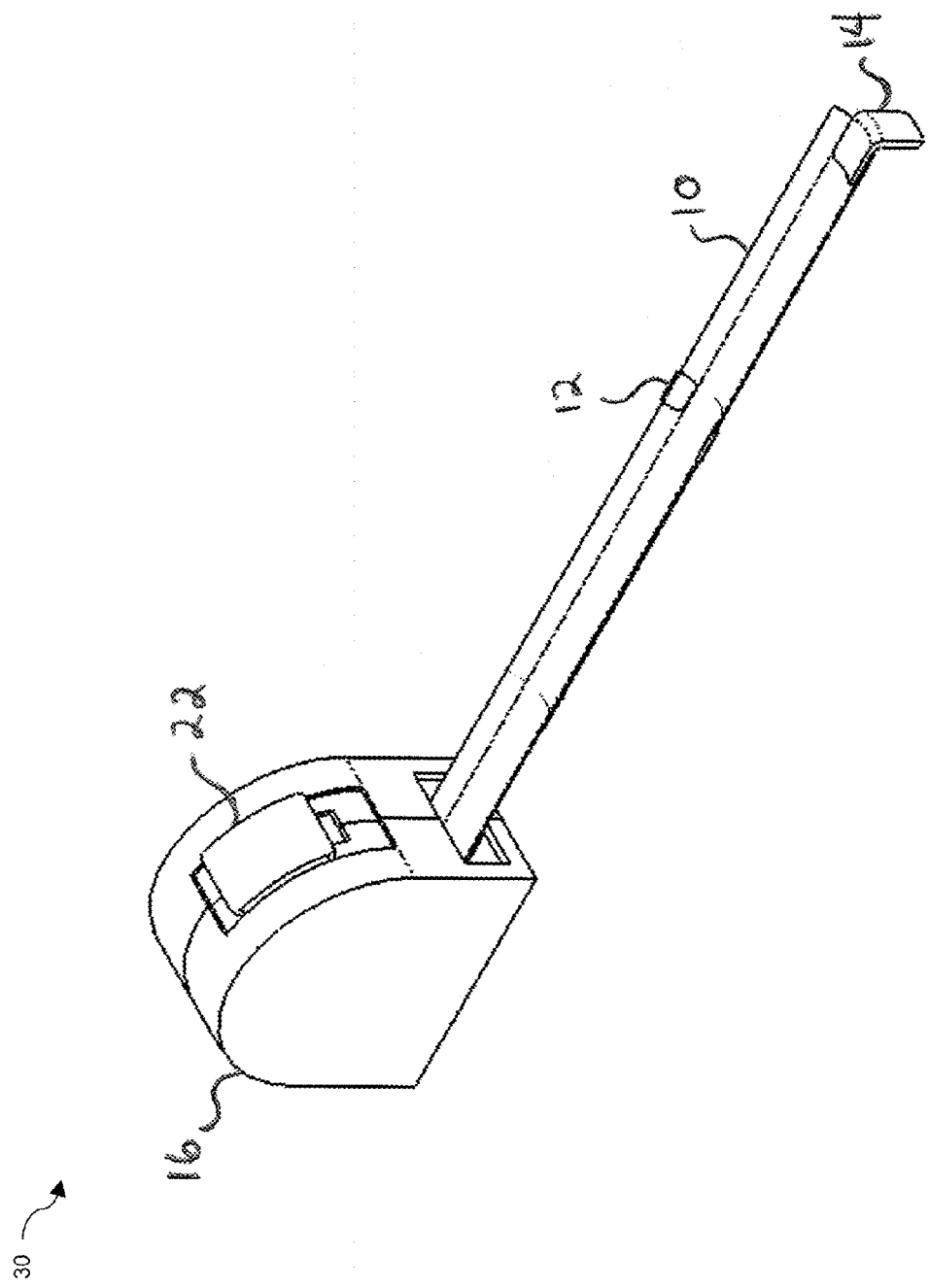
FIG. 3 is a section view of a tape rule assembly in accordance with the teachings of this disclosure.

FIG. 3 is an isometric view of the assembly illustrating the operation of the layer tape rule apparatus of this disclosure. The tape rule is extended in the usual manner for general tasks. In one embodiment, in shorter extension type tasks, only the primary tape rule 10 need extends beyond the housing for flexible utility. This also serves the purpose of minimizing the extended mass. As the primary rule 10 is extended for longer extension type tasks, the leading end of the secondary tape rule 12 may extend beyond the housing, increasing the combined section stiffness and stand out length, and reducing sag.

As the combined tape rule assembly extends, the leading end of the secondary tape 12 moves lengthwise relative to the primary tape 10 to adjust for relative length changes encountered while unrolling from the reel. When the secondary tape rule 12 trailing edge is in the housing 16 and the leading edge is extended from the housing, the leading edge moves lengthwise relative to the primary tape rule to adjust for relative length changes while rolling. For the longest extension type tasks the secondary tape rule 12 trailing edge exits the housing 16. This minimizes material within the housing 16 when fully retracted and results in a smaller, lighter weight assembly. The combined tape rule assembly retracts in the usual manner and the section is induced to collapse by rolling around the reel 18.

There are other ways in which this layer beam measurement apparatus of this disclosure may be embodied. For example, in one embodiment, the secondary tape is affixed at the leading edge using an assembly that allows lengthwise relative motion of tapes. The secondary tape trailing edge may extend to the primary tape rule reel interface, or the secondary tape rule leading edge may extend to the primary tape rule hook interface. It is contemplated that the secondary tape rule may be rigidly affixed using welds, adhesive or rivets at leading edge and affixed in such a way as to allow lengthwise relative motion of tapes at the trailing edge. Alternatively either rule may be bent or formed at its leading edge(s) to overlap and capture the other rule.

In various embodiments, the primary tape rule may have a varying thickness, width, or radius as compared to the secondary tape rule. It is contemplated that another secondary rule 122, as shown in FIG. 3, or any number of secondary rules may be employed, and they may be deployed progressively or simultaneously as the tape rule assembly extends.

In one preferred embodiment, the primary and secondary tape rules may be mounted on separate reels within housing to allow independent motion between tapes. The secondary tape may be mounted to allow relative motion at both ends, or mounted to allow lengthwise relative motion at both leading and trailing edges.

It is further contemplated that the primary rule may be marked with measurement indicia, however the secondary tape may include marking indications as well. The two tapes may be marked in such a way to provide interaction features between the primary tape rule and secondary tape rule. For example, markings on the two tapes may be configured to provide variant measurement systems, units or arithmetic tools.

In terms of construction, it is contemplated that the secondary tape may comprise a convexo-concave orientation.

Additionally, it is contemplated that the hook will normally be affixed to the primary tape, however, the secondary tape may also includes a hook or plurality of hooks. Alternate materials may be used for the primary and secondary tape rule sections, such as steel, plastic, resin impregnated fibrous cloth, or a combination of these.

The tape assembly may also be constructed of a single tape rule with varying thickness or a single tape rule with a varying curve that is flatter at the leading edge, and gradually changes to a deeper curve near the trailing edge of the tap.

The tape assembly may also be constructed of a single tape rule incorporating a shape memory element such that when the tape is extended to greater lengths the tape rule either manually or automatically changes its cross section to a deeper curve down its entire length or alternatively near known lengths of excessive bending or folding.

As will now be appreciated, a new, improved tape rule that increases stiffness and standout length over standard tape rules has been described. This invention can provide a variety of benefits, including increased blade flexibility while performing short extension related tasks, increased standout and reduced sag while performing tasks requiring longer extensions, reduced size and weight for tasks requiring the longest extensions and adds the ability to utilize alternate measurement methods or units and built in computational references.

While embodiments and applications of this invention have been shown and described, it will now be apparent to those skilled in the art having the benefit of this disclosure that many more modifications than mentioned above are possible without departing from the inventive concepts disclosed herein.

We claim:

1. A multi-layer tape rule assembly, comprising:
a housing including a reel and a coil spring that provides a rotation bias to the reel;
a pliable primary rule including a leading edge, a trailing edge, and two side long edges, wherein the primary rule includes a curved cross section, wherein the trailing edge is coupled to the reel;
a hook that is coupled to the leading edge of the primary rule; and
a pliable secondary rule including a second leading edge and a second trailing edge, wherein the secondary rule includes a curved cross section,
wherein the primary rule is nestled in the secondary rule and the secondary rule is wider than the primary rule and includes two second side long edge portions that wrap around the side long edges of the primary rule to slidably affix the secondary rule to the primary rule;
wherein the secondary rule is shorter in length than the first rule, and wherein the secondary rule retracts into the housing when the first rule retracts into the housing.

2. The multi-layer tape rule of claim 1, wherein both the primary rule and the secondary rule retract into the housing by rolling around the reel.

3. The multi-layer tape rule of claim 1, wherein the second leading edge is substantially rigidly affixed to the primary rule and the second trailing edge slidably moves relative to the primary rule.

4. The multi-layer tape rule of claim 1, wherein the second trailing edge is substantially rigidly affixed to the primary rule and the second leading edge slidably moves relative to the primary rule.

5. The multi-layer tape rule of claim 4, wherein the second trailing edge is substantially rigidly affixed to the primary rule with a fastener selected from the group consisting of: a weld, an adhesive, a rivet, and a hooking mechanism.

6. The multi-layer tape rule of claim 1, wherein the second side long edge portions that wrap around the side long edges of the primary rule extend a portion of the length of the secondary rule that is less than the total length of the secondary rule.

7. The multi-layer tape rule of claim 1, wherein the geometry of the primary rule is substantially different from the geometry of the secondary rule.

8. The multi-layer tape rule of claim 7, wherein the primary rule and the geometry of the secondary rule are different in a geometry selected from the group consisting of: thickness, width, and radius.

9. The multi-layer tape rule of claim 1, further including another secondary rule that is wider than the primary rule and is shorter in length than the primary rule.

10. The multi-layer tape rule of claim 9, wherein the other secondary rule is shorter in length than the secondary rule.

11. The multi-layer tape rule of claim 1, wherein the primary rule includes first markings and the secondary rule includes second markings, wherein the first and second markings cooperatively provide a length measurement.

12. The multi-layer tape rule of claim 11, wherein the first markings are of a first measurement unit and the second markings are of a second measurement unit.

13. The multi-layer tape rule of claim 11, wherein the first markings are of a measurement unit and the second markings are of an arithmetic tool.

14. The multi-layer tape rule of claim 1, wherein the primary rule includes a varying radius along the length of the primary rule.

15. The multi-layer tape rule of claim 14, wherein the primary rule includes a first radius at the leading edge and a second radius at the housing, wherein the first radius is smaller than the second radius, and the radius along the length of the primary rule graduates from the first radius to the second radius.

16. The multi-layer tape rule of claim 15, wherein the primary rule includes a shape memory element that forms the second radius.

17. A multi-layer tape rule assembly, comprising:
a housing including a reel and a coil spring that provides a rotation bias to the reel;
a pliable primary rule including a leading edge, a trailing edge, two side long edges, and includes a curved cross section, wherein the trailing edge is coupled to a circumference of the reel;
a hook that is coupled to the leading edge of the primary rule; and a pliable secondary rule including a second leading edge, a second trailing edge, and includes a curved cross section;

wherein the primary rule is nestled in the secondary rule and the secondary rule is wider than and less than twice the width of the primary rule and includes two second side long edge portions that wrap around the side long edges of the primary rule to slidably affix the secondary rule to the primary rule;

wherein the secondary rule is shorter in length than the primary rule, and wherein the secondary rule retracts into the housing when the first rule retracts into the housing and both the primary and the secondary rule retract into the housing by rolling around the reel; and wherein the second trailing edge is substantially rigidly affixed to the primary rule and the second leading edge slidably moves relative to the primary rule.

\* \* \* \* \*